(12) United States Patent
Frame

(10) Patent No.: US 7,012,643 B2
(45) Date of Patent: Mar. 14, 2006

(54) ONE CHIP, LOW LIGHT LEVEL COLOR CAMERA

(75) Inventor: Wayne W. Frame, Cedaredge, CO (US)

(73) Assignee: Ball Aerospace & Technologies Corp., Boulder, CO (US)

( * ) Notice: Subject to any disclaimer, the term of this patent is extended or adjusted under 35 U.S.C. 154(b) by 2 days.

(21) Appl. No.: 10/142,320

(22) Filed: May 8, 2002

(65) Prior Publication Data

US 2003/0210332 A1 Nov. 13, 2003

(51) Int. Cl.
*H04N 3/14* (2006.01)
*H04N 5/335* (2006.01)
*H04N 9/04* (2006.01)
*H04N 9/083* (2006.01)

(52) U.S. Cl. ..................... 348/272; 348/273
(58) Field of Classification Search ............ 348/216.1, 348/217.1, 235, 236, 238, 164, 272–274, 348/275, 276, 277; 250/331, 339.05, 339.01, 250/339.02
See application file for complete search history.

(56) References Cited

U.S. PATENT DOCUMENTS

| | | | | |
|---|---|---|---|---|
| 3,576,392 A | * | 4/1971 | Hofstein ..................... 348/331 |
| 3,604,842 A | * | 9/1971 | Harwood ..................... 348/647 |
| 3,971,065 A | | 7/1976 | Bayer ........................... 358/41 |
| 4,339,771 A | | 7/1982 | Morishita et al. ............. 358/41 |
| 4,667,226 A | * | 5/1987 | Glenn ......................... 348/344 |
| 4,700,220 A | | 10/1987 | Yasuda et al. ................ 358/44 |
| 4,709,259 A | * | 11/1987 | Suzuki ....................... 348/280 |
| 4,758,883 A | | 7/1988 | Kawahara et al. ............ 358/44 |
| 4,903,122 A | | 2/1990 | Ozaki et al. .................. 358/48 |
| 4,967,276 A | * | 10/1990 | Murakami et al. .......... 348/164 |
| 5,172,220 A | * | 12/1992 | Beis ........................... 348/262 |
| 5,251,019 A | * | 10/1993 | Moorman et al. .......... 348/275 |
| 5,267,028 A | | 11/1993 | Suga et al. .................... 358/44 |
| 5,278,660 A | | 1/1994 | Sugiki .................... 358/213.22 |
| 5,852,468 A | | 12/1998 | Okada ......................... 348/272 |
| 5,874,994 A | | 2/1999 | Xie et al. .................... 348/349 |
| 6,091,451 A | | 7/2000 | Farr et al. .................... 348/342 |
| 6,181,376 B1 | | 1/2001 | Rashkovskiy et al. ...... 348/273 |
| 6,188,433 B1 | | 2/2001 | Orbock ....................... 348/297 |
| 6,211,521 B1 | * | 4/2001 | Bawolek et al. ....... 250/339.02 |
| 6,215,597 B1 | * | 4/2001 | Duncan et al. ............. 359/637 |
| 6,292,212 B1 | * | 9/2001 | Zigadlo et al. ............... 348/33 |
| 6,456,793 B1 | * | 9/2002 | Ray et al. ..................... 396/89 |
| 6,486,974 B1 | * | 11/2002 | Nakai et al. ................. 358/1.9 |
| 6,759,646 B1 | * | 7/2004 | Acharya et al. ............ 250/226 |

(Continued)

FOREIGN PATENT DOCUMENTS

JP 58-020091 * 5/1983

*Primary Examiner*—David L. Ometz
*Assistant Examiner*—Yogesh Aggarwal
(74) *Attorney, Agent, or Firm*—Sheridan Ross P.C.

(57) ABSTRACT

A high sensitivity, single chip, low light level imaging device is provided. The imaging device of the present invention utilizes sparse color sampling, to maximize the luminance information gathered. In particular, color information is gathered by a small proportion of the pixels included in an image sensor, while the remaining pixels operate at full spectrum sensitivity. The present invention allows the correct hue of objects to be determined, while providing high sensitivity to available luminance information in a scene. In addition, the present invention allows hue information to be ascribed to objects in a scene, even in combination with luminance data collected over a spectrum that includes the near infrared and infrared wavelengths.

53 Claims, 12 Drawing Sheets

U.S. PATENT DOCUMENTS

2002/0063789 A1 * 5/2002 Acharya et al. ............. 348/273
2002/0067413 A1 * 6/2002 McNamara ................. 348/216
2002/0118861 A1 * 8/2002 Jouppi et al. ................ 382/103
2004/0174446 A1 * 9/2004 Acharya ..................... 348/279

* cited by examiner

ONE CHIP, LOW LIGHT LEVEL COLOR CAMERA

FIELD OF THE INVENTION

The present invention relates to low light level imaging devices. In particular, the present invention relates to electronic low light level imaging devices that are sensitive to infrared wavelengths and that are capable of providing color information.

BACKGROUND OF THE INVENTION

Low light level imaging devices are useful in a wide variety of applications. For example, low light level imaging devices are useful in nighttime surveillance activities. In low light level conditions, it is important for sensors to take advantage of every available photon. Approaches to providing human perceptible images in low light conditions have included the use of image intensifiers. Other approaches to providing images in low light conditions have utilized the detection of light having wavelengths outside of the visible spectrum. Although such approaches have had success in providing human perceptible images of scenes that could not otherwise be viewed by the human eye, such approaches have been unable to provide chrominance information in combination with high sensitivity at low light levels.

Image intensifiers are generally formed using microchannel plates. In particular, a photocathode is positioned near a honeycomb of small channels (or microchannels) upon which a voltage gradient is imposed. When a photon collides with the photocathode, an electron is released and is accelerated along a channel. The electron is focused on a phosphorous screen, which produces photons in response to being bombarded by the electrons ejected by the microchannel. The resulting image on the phosphorous screen may be viewed directly, or may be converted into digital information by a imaging device, such as a charge coupled device (CCD).

The amplification of light provided by an image intensifier is effective in providing views of scenes at low light levels. However, the use of a phosphorous screen results in a monochromatic image. In addition, the limited resolution of the microchannel element in turn limits the image resolution available at the phosphorous screen. Also, a "halo" effect can occur when electrons bounce off the mouth of a channel and hit a neighbor channel. Furthermore, image intensifiers require a relatively high voltage for operation, and have a finite life span.

Another approach to providing high sensitivity imaging devices in low light conditions is to utilize image sensors that are capable of detecting light falling outside of the normal range of human vision. For example, typical nighttime scenes are relatively rich in infrared light wavelengths. Therefore, by detecting infrared wavelengths and providing the detected infrared information as luminance (or brightness) information to a human perceptible display, high sensitivity may be obtained. However, systems utilizing imagers that are sensitive to infrared wavelengths do not provide information regarding the colors of objects present in the imaged scene.

As a further alternative, imaging devices or cameras utilizing three image sensors or chips for detecting color information, and a fourth chip for detecting luminance information have been proposed. However, multichip designs are difficult to manufacture and implement. In addition, the ability of such designs to provide high sensitivity is compromised, by splitting the light gathered by the device's lens system among four different imagers. Furthermore, the use of four separate image sensors results in an overall package that is relatively large and expensive to produce.

In consumer and military applications, it is desirable to provide imaging devices that are relatively small and light, and that use relatively little power. Accordingly, most consumer imaging devices and many imaging devices designed for military applications utilize a single image sensor. As a result, existing imaging devices that provide color information are relatively insensitive in low light conditions, while imaging devices optimized for high sensitivity and low light conditions typically provide a monochromatic image.

The visual tasks of detection and recognition can be greatly aided if color information is provided to the viewer. Imaging devices capable of providing color information typically do so by separately sampling light having bands of color centered on the red, green, and blue portions of the spectrum. However, because filtering light requires the rejection of at least some components of the light incident on the filter, filtering reduces the sensitivity that might otherwise be available from an imaging device. One approach to increasing the light sensitivity of an image sensor used in connection with a color imaging device is described by Bayer in U.S. Pat. No. 3,971,065. The filter, known as a Bayer filter, disclosed therein establishes pixel subsets distributed across the entire array of pixels in an image sensor. Each subset of pixels consists of one pixel having a filter that admits red light, one pixel having a filter that admits blue light, and two pixels having filters that admit green light. The Bayer filter favors green filter elements because green is the main contributor to the luminance information in a scene. This preference for luminance (or brightness) information over chrominance information provides an image sensor with greater sensitivity and resolution. However, because at least some filtering is performed before photons reach the pixels of the image sensor, the sensitivity of devices employing Bayer filtration could be improved.

It would be desirable to provide an electronic color imaging device that is capable of providing high sensitivity. In addition, it would be advantageous to provide such a device that utilized a single image sensor. Furthermore, it would be desirable to provide such a device that was relatively inexpensive to implement and easy to manufacture.

SUMMARY OF THE INVENTION

In accordance with the present invention, a one chip, low light level imaging device, including a color camera, is provided. In accordance with an embodiment of the present invention, more than half of the pixels comprising the device's image sensor receive unfiltered light. Furthermore, less than half of the pixels of the image sensor receive filtered light, to provide color information to the user. In accordance with an embodiment of the present invention, the pixels of the image sensor that receive unfiltered image information are sensitive to light having wavelengths extending across the visible spectrum and into the near infrared and infrared wavelengths.

In accordance with an embodiment of the present invention, the number of pixels receiving filtered light is small, as compared to the number of pixels receiving unfiltered light. For example, in accordance with an embodiment of the present invention, less than about ten percent of the pixels of the image sensor are provided with filtered light. In accordance with another embodiment of the present invention, less than about four percent of the pixels of the image sensor are provided with filtered light.

In accordance with another embodiment of the present invention, color information obtained by pixels receiving filtered light is assigned to pixels receiving unfiltered light through interpolation. In accordance with still another embodiment of the present invention, color information is associated with pixels receiving unfiltered light by convoluting the signals obtained by pixels receiving filtered light with a suitable kernel.

In accordance with still another embodiment of the present invention, the pixels receiving filtered light are distributed among the pixels of the image sensor. For example, the image sensor may be considered as a plurality of pixel subsets. Each pixel subset comprises a group of pixels having n rows and m columns. Within each subset, a group of pixels is provided with filtered light. For example, a first pixel may be provided with red light, a second with green light, and a third with blue light. As a further example, a first and a second of the pixels may be provided with green light, a third with red light, and a fourth with blue light. The color value sensed by the pixels receiving filtered light may then be assigned to all of the pixels included in the subset of pixels. In accordance with an embodiment of the present invention, the pixels receiving filtered light are positioned at or near the center of the subset of pixels. In accordance with a further embodiment of the present invention, the subsets of pixels are arranged about the image sensor in a staggered configuration, to reduce aliasing of color features in an observed scene. In another embodiment of the present invention, pixels receiving filtered information are distributed randomly or pseudo-randomly about the image sensor.

In accordance with the present invention, a method for providing a color image in low light environments is provided. In accordance with an embodiment of the present invention, the light provided to a small proportion of pixels included as part of an image sensor is filtered to obtain a color signal. The color signal thus obtained is assigned to areas of the image corresponding to pixels that receive unfiltered image information. Additional advantages of the present invention will become readily apparent from the following description, particularly when taken together with the accompanying drawings.

DETAILED DESCRIPTION

According to the present invention, a one chip, low light level color imaging device or camera is provided.

Figure 1:
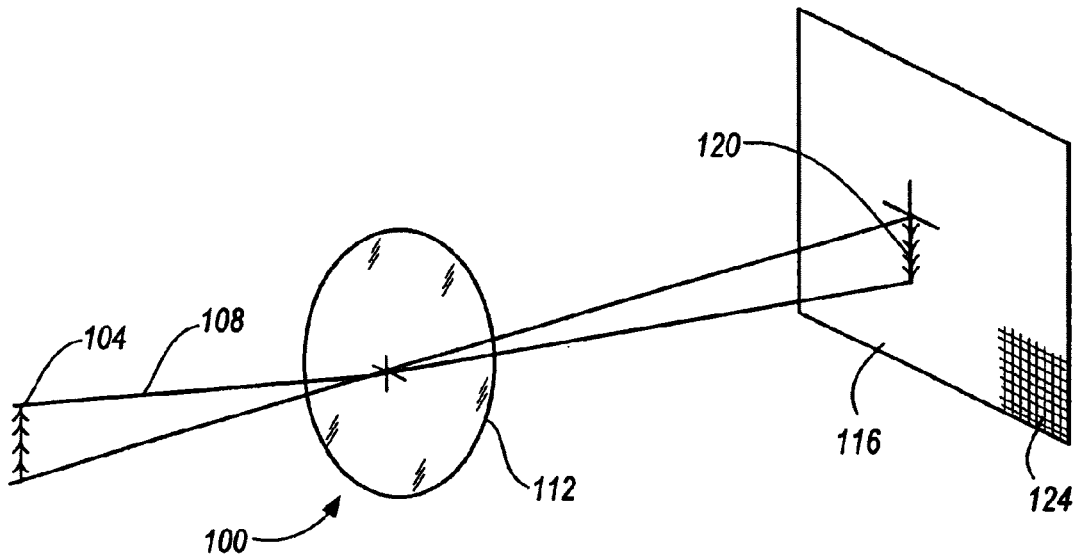
FIG. 1 illustrates an electronic imaging device configuration.

In FIG. 1, a digital imaging device 100 configuration suitable for use in connection with the present invention is illustrated. As shown in FIG. 1, an object 104 reflects light 108 that is focused by a lens or lens system 112 onto an image sensor 116 as an image object 120. The image sensor 116 is comprised of a plurality of photosensitive elements or pixels 124. The pixels 124 are distributed over the surface of the image sensor 116 in a two-dimensional array. The pixels 124 generally convert the light focused onto the surface of the image sensor 116 by the lens 112 (i.e. the image object 120) into electronic signals.

In a conventional color imaging device, each of the pixels 124 of the image sensor 116 receive light within one of three overlapping frequency bands. The relative intensity of the light received by individual pixels 124 included in a group of pixels in which each of the different frequency bands are represented enables the image sensor 116 to provide color information. Furthermore, the image information received by pixels 124 that are particularly sensitive to luminance information (i.e., pixels receiving green light) allows the image sensor 116 to provide a signal corresponding to details of the image object 120. As will be explained in detail below, an imaging device 100 in accordance with the present invention allows a larger proportion of the pixels 124 to contributed luminance information than a conventional device, increasing the sensitivity of the device, while continuing to provide color information.

Figure 2:
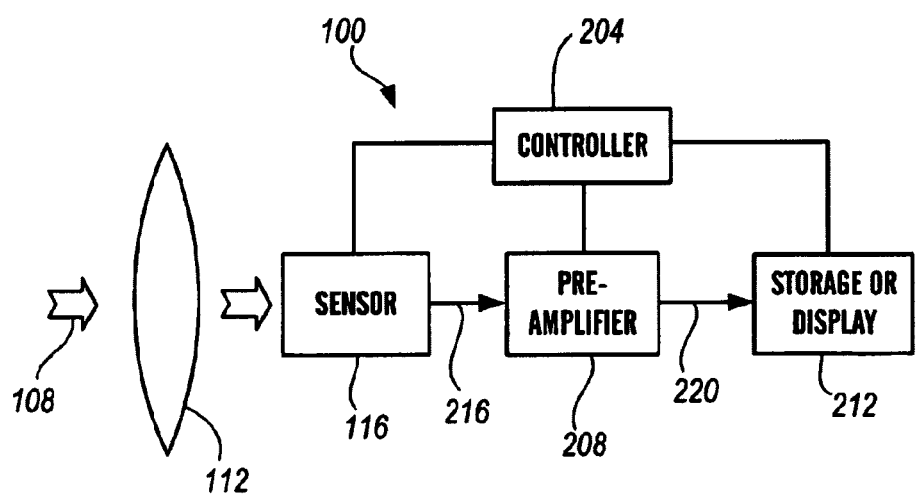
FIG. 2 is a block diagram depicting major components of an electronic imaging device.

With reference now to FIG. 2, a block diagram depicting the major functional components of an imaging device 100 are illustrated. As noted above in connection with FIG. 1, a digital imaging device or camera 100 typically includes a system for focusing light reflected by images onto the image sensor 116 in the form of a lens or lens system 112. In addition to the lens or lens system 112 and the image sensor 116 as shown in FIG. 2, a digital image device 100, including a digital imaging device or camera 100, in accordance with the present invention, may include a controller 204, a preamplifier 208, and a storage and/or display device 212. In general, the controller 204 controls the operation of the electronic components (e.g., the image sensor 116, preamplifier 208 and storage and/or display 212) included in the device 100. With respect to the image sensor 116, the controller 204 controls the frame rate at which image information is converted into electronic form by the image sensor 116. The electronic information regarding the image object 120 produced by the image sensor 116 is provided to the preamplifier 208 for amplification. The controller 204 may control the amount of gain imparted by the preamplifier 208 to the electronic image signal 216 received by the preamplifier 208. The amplified image signal 220 may then be provided to the storage device and/or display device 212. The image information stored or displayed by a storage device and/or display device 212, in accordance with the present invention, includes information calculated by the controller 204. Such information includes color information related to pixels. In particular, the controller 204 is capable of determining color information related to areas of the image sensor 116 with respect to which color information is not provided as part of the electronic image signal 216. The function of the controller 204 in determining this color information will be described in greater detail below.

Figure 3:
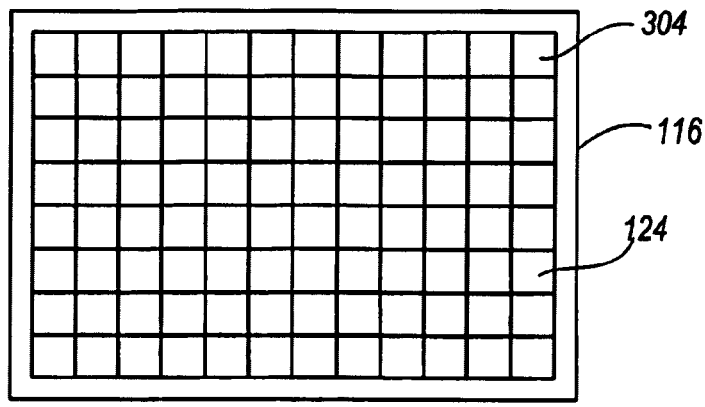
FIG. 3 depicts the imaging surface of an image sensor.

With reference now to FIG. 3, the imaging surface 304 of an image sensor 116 in accordance with an embodiment of the present invention is illustrated. As shown in FIG. 3, the pixels 124 comprising the imaging surface 304 of the image sensor 116 are distributed across the imaging surface 304 in rows and columns. However, it should be appreciated that other arrangements of pixels 124 may be utilized. For example, the position of pixels in a first row may be staggered from the position of pixels in a second row to create a pattern that does not result in the pixels being arranged in continuous columns.

Figure 4:
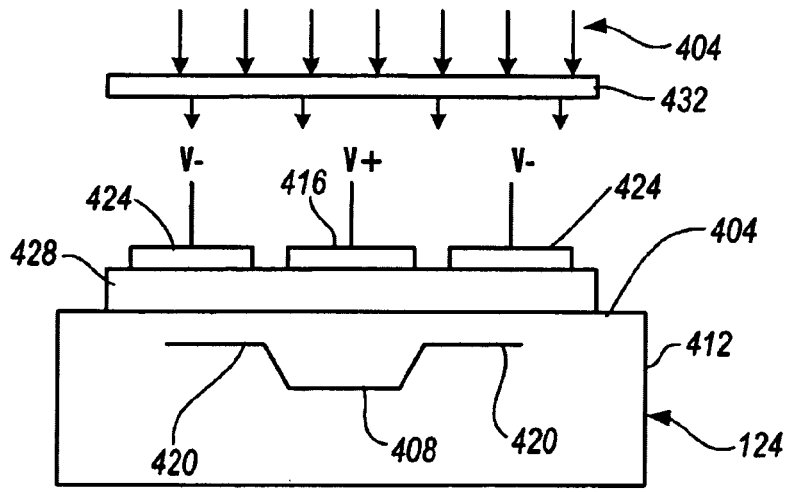
FIG. 4 depicts a pixel of an image sensor.

With reference now to FIG. 4, a cross-section of an individual pixel 124 is depicted. The pixel 124 shown in FIG. 4 is a charge coupled device. A charge coupled device type pixel 124 converts light 404 incident on the active surface of the pixel 124 into an electronic charge. This electronic charge is collected in a potential well 408 that is established by applying a voltage to the silicone substrate 412 through a gate electrode 416 to which a positive voltage is applied. The electrons are confined in the well 408 during the exposure period by a potential barrier 420 created by applying negative voltages to barrier electrodes 424. In a typical device, the electrodes 416, 424 are insulated from the substrate 412 by a layer of silicone dioxide 428.

Also illustrated in FIG. 4 is a filter element or microfilter 432. A filter element 432 is associated with selected pixels 124 to allow the image sensor 116 to provide color information. The filter element 432 generally functions to allow one of three spectral regions (i.e. colors) to pass through to the pixel 124.

After the desired period of exposure has elapsed, the barrier 420 is lowered, and the collected charge is transferred to a serial register. In general, charge collected by rows of pixels 124 are shifted into the serial register. Alternatively, an entire array of pixels 124 may be shifted into an identically sized storage array during readout of the image.

Figure 5:
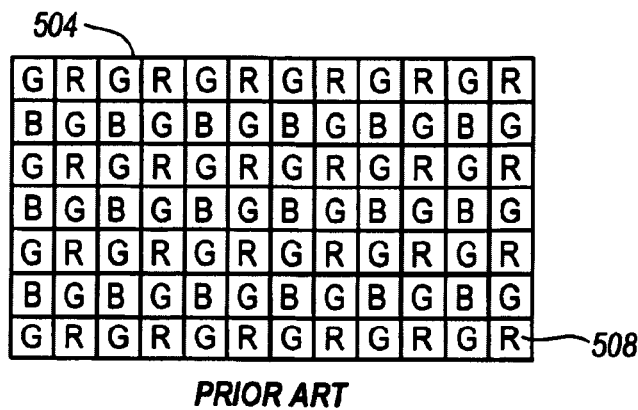
FIG. 5 depicts a filter in accordance with the prior art.

In FIG. 5, a filter 504 for providing color information in connection with an image sensor 116 in accordance with the prior art is illustrated. In general, the filter 504 includes a plurality of microfilter elements 508. In general, a single filter element 508 is provided for each pixel 124 (see FIG. 3) of the image sensor 116. Accordingly, each pixel 124 receives light within a selected frequency band. According to alternative methods for providing color information, a filter 504 may operate in sequence to provide a first color to the pixels 124 (e.g., green) and the information provided while that first frequency band is in effect read out. Next, the filter 504 may provide filtered light within a second frequency band (e.g., red), and the information obtained during operation of the filter mode providing the second frequency band read from the pixels 124. Finally, a third filter mode may be entered by the filter 504 to provide the pixels 124 with a third frequency band (e.g., blue). Under either scheme, it can be appreciated that the pixels 124 of the image sensor 116 always receive filtered light information in a color camera in accordance with the prior art. Therefore, during operation of such a camera, some available photons are removed from the light that might otherwise be available to the pixels comprising the image sensor 116.

Figure 6:
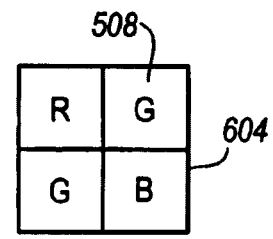
FIG. 6 depicts a filter element in accordance with the prior art.

The filter scheme illustrated in FIG. 5 utilizes subgroups of pixels 124. Such a subgroup 604 is generally illustrated in FIG. 6. From FIG. 6, it is apparent that each subgroup 604 contains four filter elements 508. One filter element allows red light to pass, and another filter element 508 allows blue light to pass. In addition, two filter elements 508 allow green light to pass. Because of the importance of green light in providing luminance information, and because color information can be adequately conveyed using a relatively small portion of the available bandwidth, the use of two green filter elements 508 per subgroup 604 tends to improve the sensitivity of the image sensor 116, while maintaining a relatively large amount of color information.

The inventor of the present invention has recognized that the sensitivity of an image sensor 116 could be further improved for use in low light applications if the number of pixels 124 receiving filtered light was reduced, thereby making more of the photons reflected from images in a scene available to the pixels 124. Furthermore, the inventor has recognized that color information that is adequate for aiding in object recognition can be supplied by providing filtered light to a very small proportion of pixels 124 of an image sensor 116.

Figure 7A:
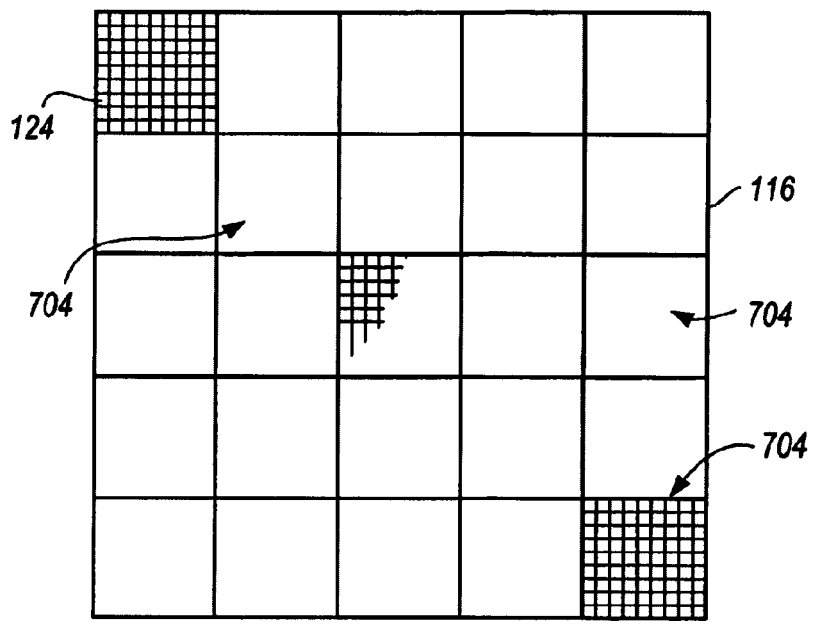
FIG. 7A depicts an image sensor in accordance with an embodiment of the present invention.

With reference now to FIG. 7A, an arrangement of pixels 124 across the imaging surface of an image sensor 116 in accordance with an embodiment of the present invention is depicted. In general, the pixels 124 are arranged in a plurality of subsets 704. For purposes of clarity, it should be appreciated that only some of the pixels 124 of the imaging sensor 116 are depicted in FIG. 7.

Figure 7B:
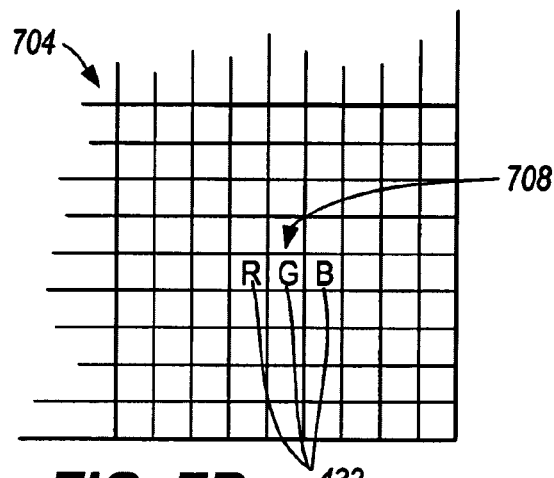
FIG. 7B depicts a subset of pixels in accordance with an embodiment of the present invention.

With reference now to FIG. 7B, a subset of pixels 704 is illustrated. As shown in FIG. 7B, a group of color information pixels 708 is associated with color filters or color filter elements 432. Alternatively, pixels 124 that are responsive to light confined to select frequency bands (i.e. colors) may comprise the group of color information pixels 708. In the example of FIG. 7B, the group of pixels 708 consists of three pixels, one of which receives light passing through a red filter 432, another that receives light passing through a green filter 432, and a third that receives light passing through a blue filter 432. Furthermore, it should be appreciated that the majority of pixels 124 included in the subset of pixels 704 do not receive filtered light. For instance, in the example subset of pixels 704 illustrated in FIG. 7B, there are 81 pixels, 78 of which receive unfiltered light, and 3 of which (or less than 4%) receive filtered light. Accordingly, the majority of pixels 124 in the subset of pixels 704 are provided with unfiltered light. In this example then, 96% of the pixels 124 in the subset of pixels 704 are sensitive to light of full spectral distribution, with the result that the sensitivity of the imaging device 100 is minimally impacted by the group of color information pixels 708.

In accordance with an embodiment of the present invention, the pixels 124 that are not among the group of pixels 708 receiving filtered light are sensitive to light having wavelengths from about 400 nm to about 1050 nm. In accordance with a further embodiment of the present invention, the color information pixel included in the group of the pixels 708 receiving red filtered light is provided with light having a wavelength from about 540 nm to about 780 nm, the pixel receiving green filtered light is provided with light having a wavelength from about 470 nm to about 610 nm, and the pixel receiving blue filtered light is provided with light having a wavelength from about 380 nm to about 510 nm.

Figure 7C:
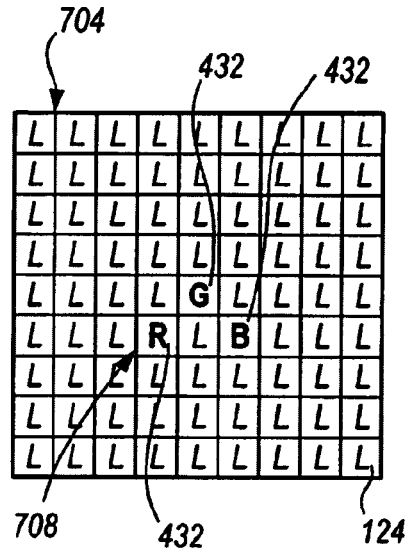
FIG. 7C depicts a subset of pixels in accordance with another embodiment of the present invention.

In FIG. 7C, a subset of pixels 704 having a group of color information pixels 708 in accordance with another embodiment of the present invention is illustrated. The subset of pixels 704 in FIG. 7C are arranged in a 9×9 array of pixels 124, with each of the color information pixels having an associated color filter element 432. Alternatively, pixels 124 that are responsive to light confined to select frequency bands may comprise the group of color information pixels 708. In the example of FIG. 7C, the group of pixels 708 consists of one pixel 124 that is responsive to red light, a second pixel 124 that is responsive to green light, and a third pixel 124 that is responsive to blue light. Furthermore, the pixels 124 receiving color information are located diagonally from their neighbor color information pixel 124. As in the example subset of pixels 704 of FIG. 7B, the majority of the pixels in the subset of pixels 704 of FIG. 7C receive light that has not been color filtered. Accordingly, the majority of the pixels 124 provide unfiltered, or full spectrum, luminance information, for high sensitivity. In the embodiment shown in FIG. 7C, less than 4% of the pixels 124 in the subset of pixels 704 receive filtered light.

Figure 7D:
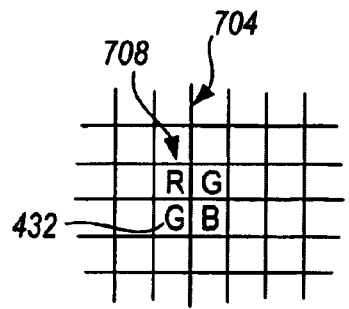
FIG. 7D depicts a subset of pixels in accordance with another embodiment of the present invention.

With reference now to FIG. 7D, a group of color information pixels 708 included in a subset of pixels 704 in accordance with another embodiment of the present invention is illustrated. The group of color information pixels 708 illustrated in FIG. 7D differs from the group of color information pixels 708 illustrated in FIGS. 7B and 7C in that the group of color information pixels 708 illustrated in FIG. 7D implements a Bayer filter. Color information regarding the imaged object 120 is obtained only from those pixels in the group of color information pixels 708. Therefore, the group of color information pixels 708 receiving light filtered to within selected frequency bands represents a small proportion (i.e. less than half) of the total pixels 124 within a subset of pixels 704. The remainder of the pixels 124 provide luminance information. This arrangement provides high sensitivity, by limiting the number of pixels 124 receiving filtered light as compared to prior art systems.

As can be appreciated, a group of color information pixels 708 preferably includes at least one pixel 124 sensitive to green light, at least one pixel 124 sensitive to red light, and at least one pixel 124 sensitive to blue light. As can further be appreciated, it is generally desirable to group the individual pixels 124 of a group of color information pixels 708 in close proximity to one another. However, the particular spacing and geometric relationship of the pixels 124 in a group of color information pixels 708 may be varied.

With the addition of a switch in the controller 204 or other processing electronics associated with the imaging device 100, the chrominance signals red, green and blue can be turned off and the system will perform almost identically to that of a monochrome camera having no color filtering. Such a switch can serve to provide color information to the displayed image only when color discrimination is desired or merited. A switch capable of disabling the chrominance signals can also be used to reduce noise. For example, when light levels are very low and signal gain for the chrominance signal is high, the noise associated with the high gain levels can be removed by turning off the signals from the color information pixels 708. When the chrominance signal is turned off, luminance information for the affected pixels can continue to be supplied by neighboring pixels 124 receiving a full spectral distribution.

Although the description set forth herein contains examples of color information pixels 708 comprising additive color schemes, such as RGB color schemes, it should be appreciated that the present invention may also utilize a complementary color scheme. For example, the color information pixels 708 may comprise a subtractive color scheme, such as Cyan Magenta Yellow (CMY). A subset of pixels 704 utilizing a subtractive color scheme may include a group of color information pixels 708 in which at least one pixel 124 is sensitive to cyan light, at least one pixel 124 is sensitive to magenta light, and at least one pixel 124 is sensitive to yellow light. The remaining pixels 124, which comprise the majority of the pixels included in the subset of pixels 704, provide luminance information.

Figure 8:
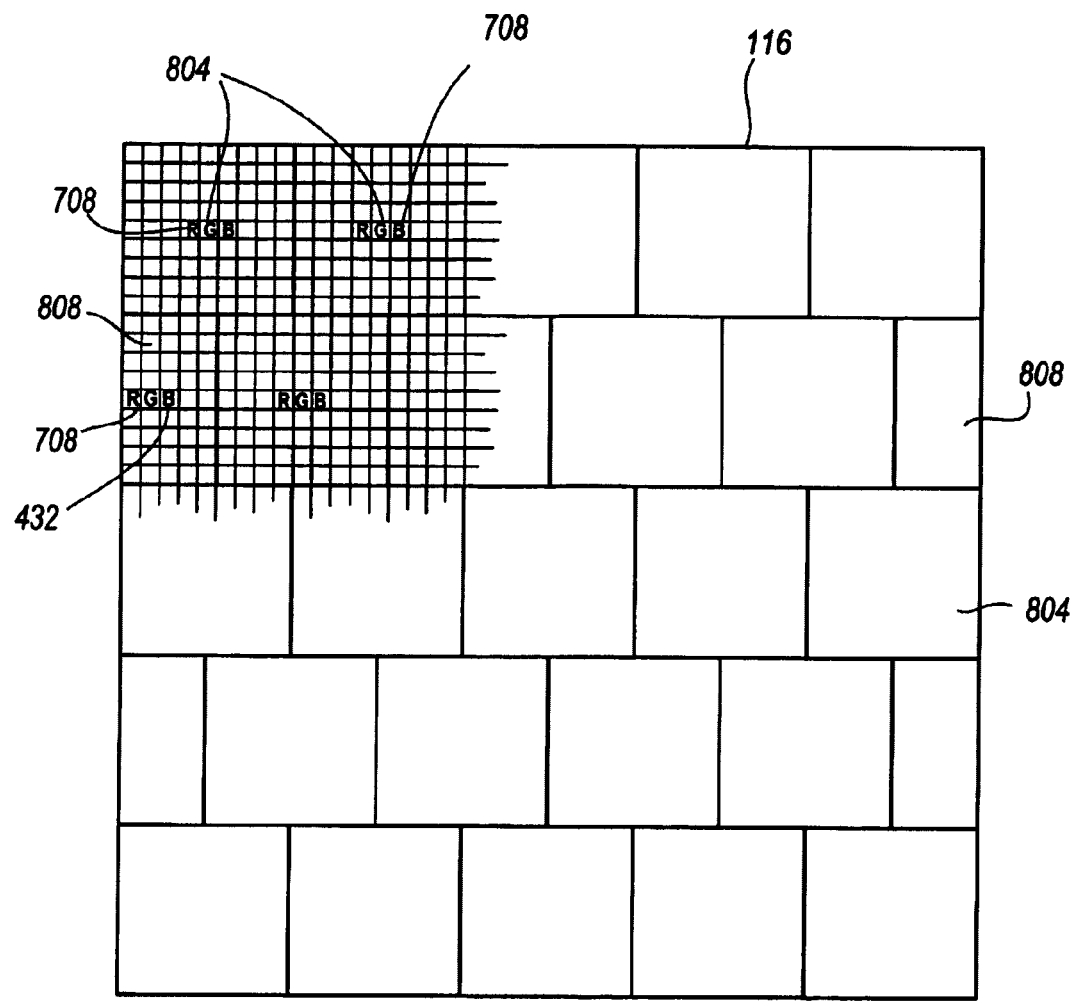
FIG. 8 depicts an image sensor in accordance with another embodiment of the present invention.

In FIG. 8, an alternative arrangement of pixel subsets are depicted. In particular, the image sensor 116 illustrated in FIG. 8 comprises square pixel subsets 804, and rectangular pixel subsets 808. The rectangular pixel subsets 808 are the result of staggering the subsets of pixels 804 with respect to one another, so that continuous columns of pixel subsets 804 are not formed. The subsets of pixels 804, 808 each contain groups of pixels 708 that receive color filtered light. The groups of pixels 708 represent a small proportion (i.e. less than half) of the total number of pixels 124 available within a subset of pixels 804, 808. By staggering the subsets of pixels 804, 808, the color information obtained by the groups of pixels 708 can reduce the aliasing that can occur as a result of the relatively sparse color information obtained by an image sensor 116 in accordance with the present invention.

Figure 9:
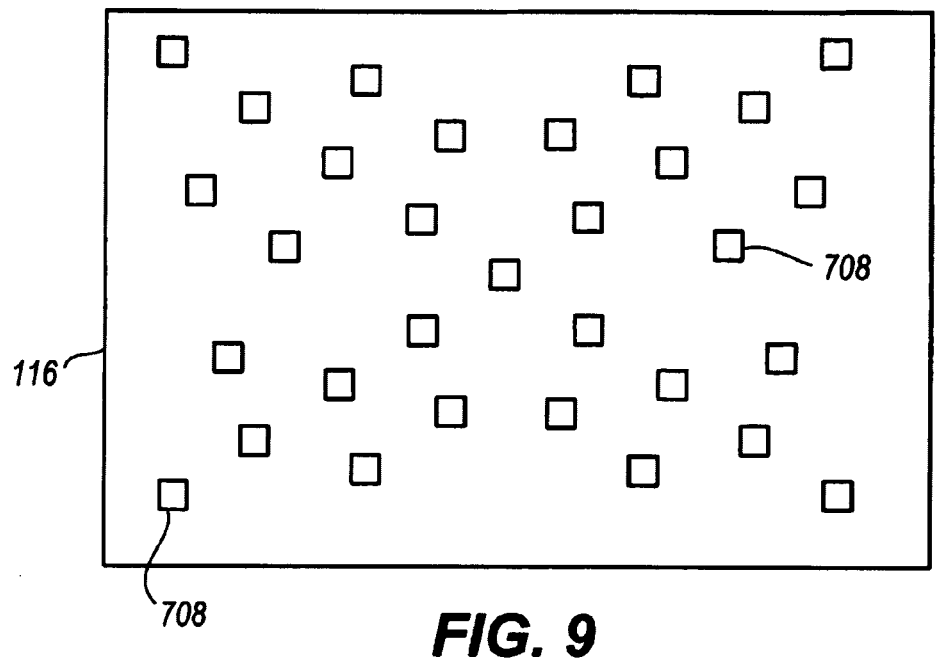
FIG. 9 depicts an image sensor in accordance with another embodiment of the present invention.

With reference now to FIG. 9, the surface of an image sensor 116 in accordance with yet another embodiment of the present invention is illustrated. In FIG. 9, groups of color information pixels 708 comprising one pixel provided with red filtered light, one pixel provided with green filtered light, and one pixel provided with blue filtered light are distributed about diagonal lines across the surface of the image sensor 116. This arrangement can also reduce the effects of the aliasing of color information.

Figure 10:
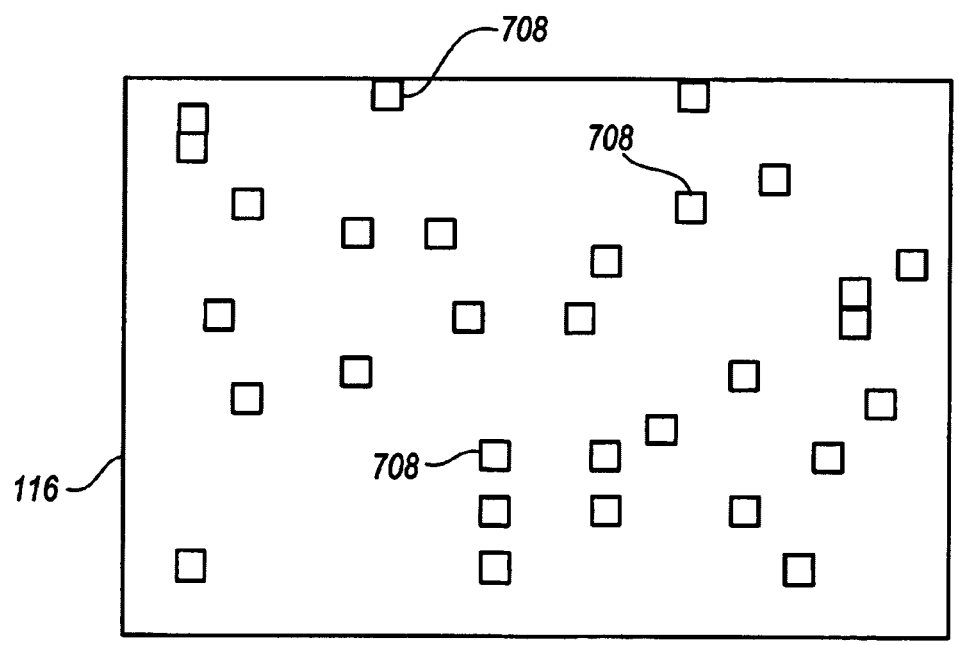
FIG. 10 depicts an image sensor in accordance with another embodiment of the present invention.

With reference now to FIG. 10, still another image sensor 116 in accordance with an embodiment of the present invention is illustrated. In FIG. 10, groups of color information pixels 708 receiving color filtered light are arranged about the surface of the image sensor 116 randomly. In accordance with an alternative embodiment of the present invention, the groups of color information pixels are distributed pseudo-randomly about the surface of the image sensor 116. In general, the distribution of groups of color information pixels 708 in horizontal and vertical lines should be minimized to minimize aliasing of the dominant horizontal and vertical lines found in most objects. In accordance with an embodiment of the present invention, less than 10% of the pixels 124 of the image sensor 116 receive color filtered light. In accordance with a further embodiment of the present invention, less than 5% of the pixels 124 of the image sensor 116 receive color filtered light.

Figure 11:
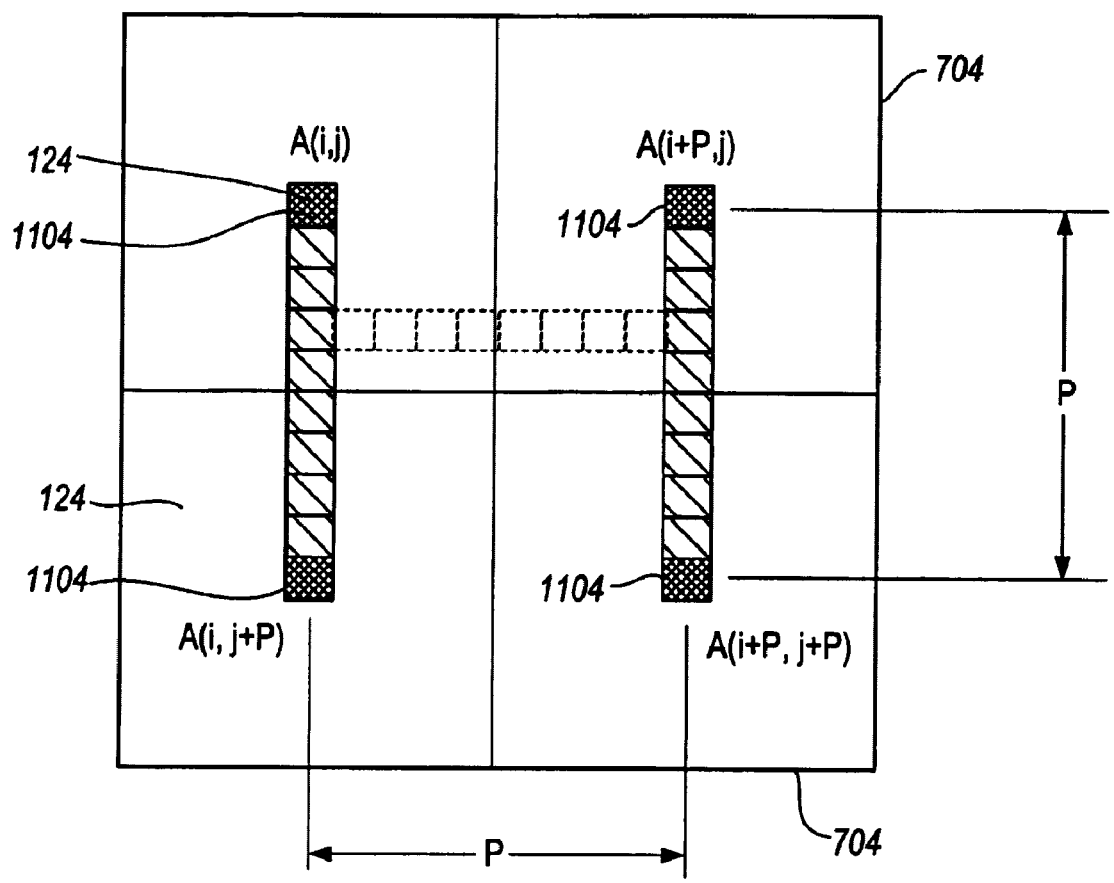
FIG. 11 depicts the determination of color information in accordance with an embodiment of the present invention.

The present invention undersamples color information because the majority of pixels 124 receive full spectrum light. FIG. 11 is a schematic representation of how color is assigned to areas of the image 120 that coincide with areas of the image sensor 116 comprising pixels 124 that receive full spectrum light (i.e. that do not receive color filtered light). In order to suppress visible artifacts that result from the invention's undersampling of color, the color signals that are received should be filtered or smoothed along both the vertical and horizontal axes of the image sensor 116. Filtering can be realized by convoluting the color channel signals with a suitable kernel. A less computationally intense approach is to provide a form of linear interpolation of the color signals. In doing so, advantage can be taken of the relatively low resolution color, compared to the limiting resolution of the entire system, in that color information can be delayed without major degradation due to image motion smear. That is, if image motion is great enough that a frame delay of the color or chrominance information is significantly impacted, the luminance signal would be degraded to the point of questionable usefulness.

One implementation of a linear interpolation approach is illustrated in FIG. 11. In FIG. 11, a single color channel and associated pixels 1104 are illustrated for purposes of clarity. The color samples are taken on a square grid having a pitch (P) equal to the dimensions of a subset of pixels 704. That is, the pitch as it relates to color information is equal to the distance between adjacent groups of color information pixels 708 (represented by single color information pixels 1104). The digitized central values for each group 708 are illustrated as A(i,j), A(i+p,j). For two adjacent groups 708 in the horizontal direction, and A(i,j), A(i,j+p) in the vertical direction. In a progressive scan device, as the image is being read from the image sensor 116, the color value for columns of pixels 124 located between the group of pixels 708 providing the central color values are estimated by suitable algorithm. For example, the color value for pixels located in columns between A(i,j) and A(i,j+p) can be estimated by:

$$A(i, j) = \big|_{n=j+(p-1)}^{n=j+1} [A(i, j) + (n \times \delta_j)]$$

where $$\delta_j = \frac{A(i, j+p) - A(i, j)}{p}$$

Accordingly, the column values between A(i,j) and A(i,j+p) are calculated using the algorithm. Likewise, the column values between A(i+p,j) and A(i+p,j+p) are also determined using the above algorithm.

As the next frame is read, all of the color values between columns containing pixels providing color information are estimated by a similar algorithm. That is, the values between A(i+1,j) and A(i+(p-1), j) where the index for i ranges from 1 to p-1, thus denoting any line value between A(i+1,j) and A(i+1,j+(p-1)). As these row color values are interpolated, the column values of the current frame being read are also calculated. In general, interpolation is carried out for each color channel in parallel and used as the smoothed or filtered chrominance signal. The edge values for the outside blocks use the nearest neighbor computed or digitized central value as appropriate. The color values of the pixels 124 that do not receive filtered light are used to provide the high resolution luminance signal. The luminance signal values for the locations occupied by the color sensing pixels 708 (i.e. the pixels receiving filtered light) can be interpolated from neighbor luminance values.

As an example of the improved sensitivity of a color imaging device 100 in accordance with the present invention, as compared to a conventional color imaging device, consider an image sensor 116 comprising 1000 rows of pixels and 1000 columns of pixels. Furthermore, assume that 100 independent color samples are taken in both the horizontal and vertical axes. For purposes of the present example, a Bayer filter type group of pixels 708 may be used for obtaining color information. Accordingly, there will be a total of 100×100=10,000 pixels receiving color information. If those pixels receiving color information are considered to provide no contribution to the luminescence signal provided by the image sensor 116, only four percent of the total photon capture area provided by the image sensor 116 has been lost. Accordingly, the sensitivity of an image sensor 116 in accordance with the present invention is comparable to the sensitivity of a monochromatic image sensor. However, the present invention provides color information. In addition, an image sensor in accordance with the present invention is capable of providing luminance information from light that extends into infrared wavelengths, again providing increased sensitivity as compared to conventional color imaging systems. Furthermore, by obtaining color information from the groups of color sensing pixels, and using the remaining pixels as sources of luminance information, an imaging device 100 in accordance with the present invention provides the correct hue, although color saturation will often be inaccurate.

In accordance with an embodiment of the present invention, luminance signal values are provided with respect to pixels 124 sensitive to selected spectral bands or colors from neighboring pixels. For example, a luminance signal for a pixel 124 receiving filtered light may be interpolated from one or more adjacent pixels that receive unfiltered light. For instance, in connection with the pixel subset 704 arrangement shown in FIG. 7C, the luminance value for each color information pixel may be derived from the luminance values for the pixels 124 on the left and right using the equation $(L_{left} + L_{right})/2$, where L is the luminance value. As a further example, the luminance value for the pixel 124 preceding a color information pixel 124 can simply be repeated using a sample and hold circuit.

Figure 12:
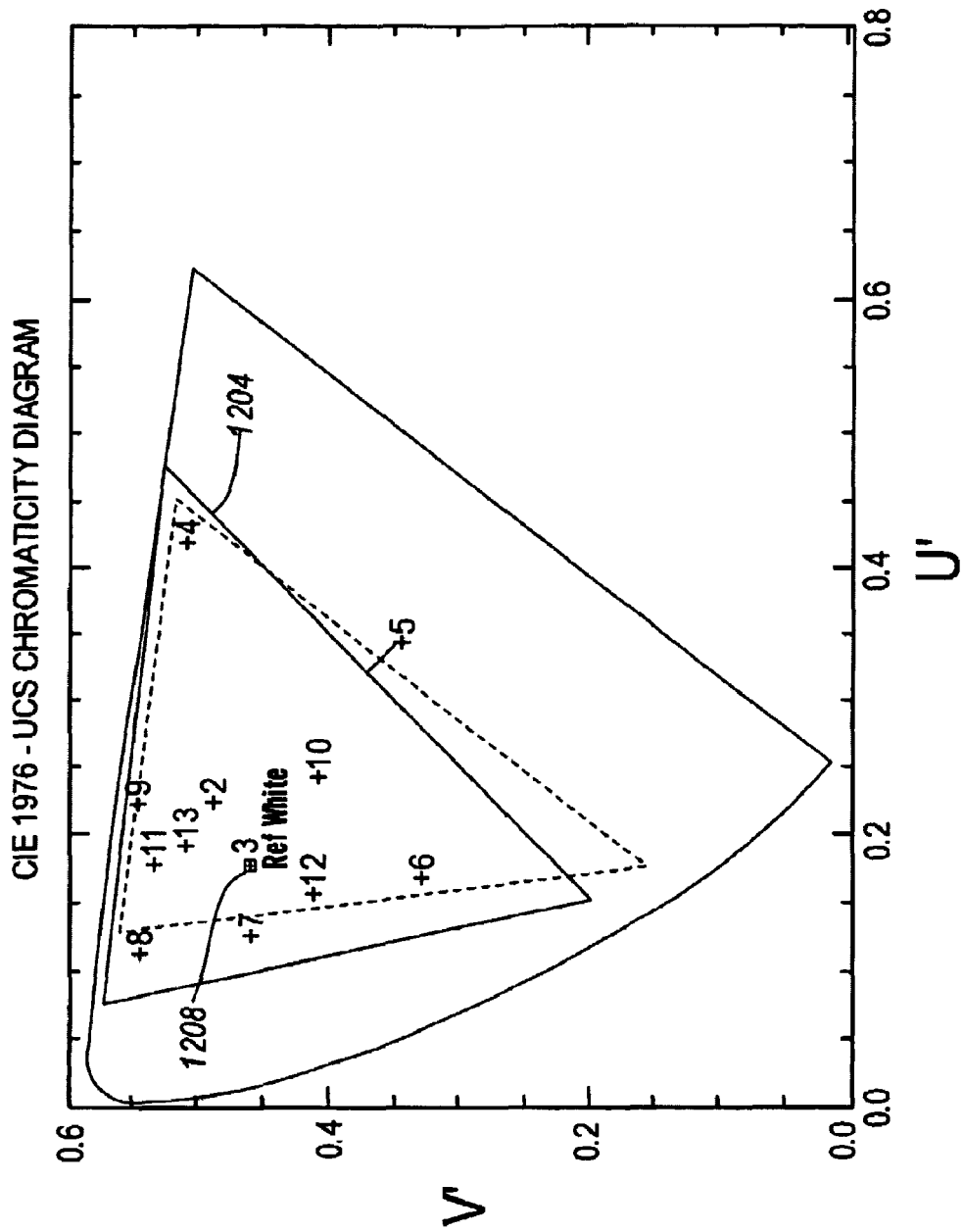
FIG. 12 is a chromaticity diagram of an ideal color imaging device.

In FIG. 12, a chromaticity diagram for an ideal color imaging system is illustrated. The display of the ideal system is set as if the scene illumination was that of a black body having a color temperature of 6500 Kelvin. The displaying primaries are as defined in specification Rec. 709 for HDTV. The gamut of colors that can be reproduced by the example ideal system fall within the triangle 1204. In FIG. 12, the hue and saturation of 13 test colors are shown by marks numbered 1–13. The output provided by this ideal system for each of the 13 test colors corresponds exactly with those test colors, with the exception of test sample no. 5, which is located outside of the range of colors that can be reproduced by the ideal system, given the reproducing primaries. Accordingly, the color of sample no. 5 is reproduced at the edge of the triangle, in line with reference white 1208, as shown by the vector emanating from the color's actual chromaticity coordinates, as delineated by the "+" next to reference no. 5. That is, the color is reproduced at the end of the vector. This is the best representation that the ideal system can provide for that color.

In the ideal system referred to with respect to FIG. 12, the spectral range of the test colors used in the simulation is from 400 nm to 1100 nm, covering both the visible and near infrared portions of the spectrum. The camera's Red-Green-Blue (RGB) taking characteristics cover only the visible portion of the spectrum, being nil for wavelengths longer than 780 nm. The luminance signal for the system is derived by summing the RGB signals in the proper proportions, as done in an NTSC TV broadcast signal.

Figure 13:
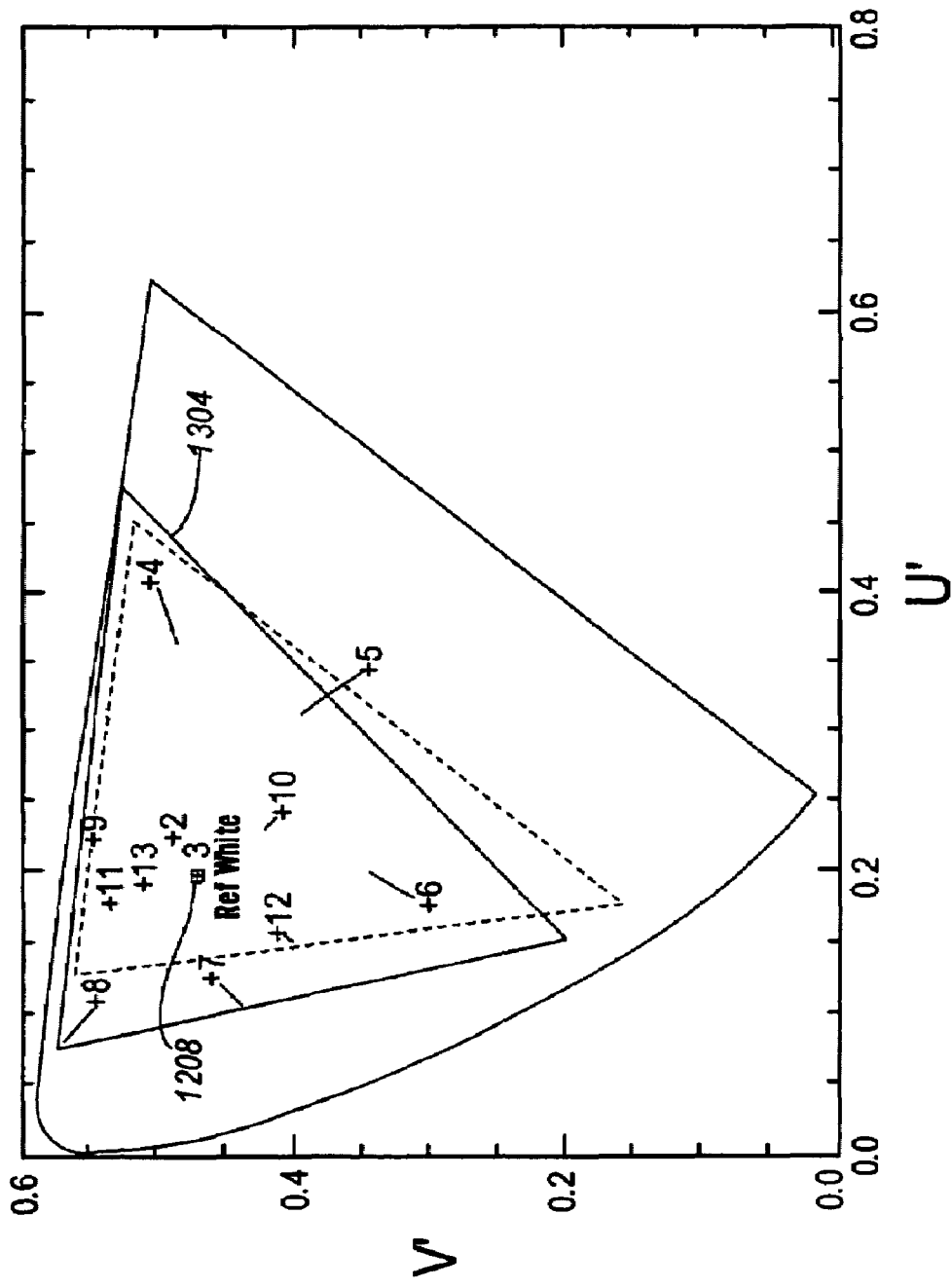
FIG. 13 is a chromaticity diagram for a color imaging device in accordance with an embodiment of the present invention.

In FIG. 13, the performance of an imaging system 100 in accordance with the present invention that provides a luminance signal generated with full spectrum (e.g. 400 nm to 1100 nm) responsivity. For example, such responsivity can be obtained using a thinned, rear illuminated CCD with an epitaxial thickness of 14 microns that is provided with light that has not been color filtered. For purposes of the test results shown in FIG. 13, the gain of the chrominance signal is several times that of the luminance signal. The gamut of colors that can be reproduced by the imaging system 1100 fall within the triangle 1304. It will be noted that most of the test colors 1–13 are reproduced by the imaging system 100 in error. However, it will also be noted that the test colors are reproduced by the imaging system 100 with the correct hue. This is shown by the orientation of the vectors associated with each of the test colors; the vectors are in line with reference white 1208. The errors generally occur with respect to the saturation of the test colors. Nonetheless, by providing the correct hue, an imaging system 100 in accordance with the present invention is capable of providing color information sufficient to aid in the task of object recognition, while providing good low light level performance (i.e. high sensitivity). Furthermore, the provision of color information is obtained, even while providing pixels operating at full spectral bandwidth (i.e. including infrared portions of the spectrum) to provide even higher sensitivity.

Figure 14:
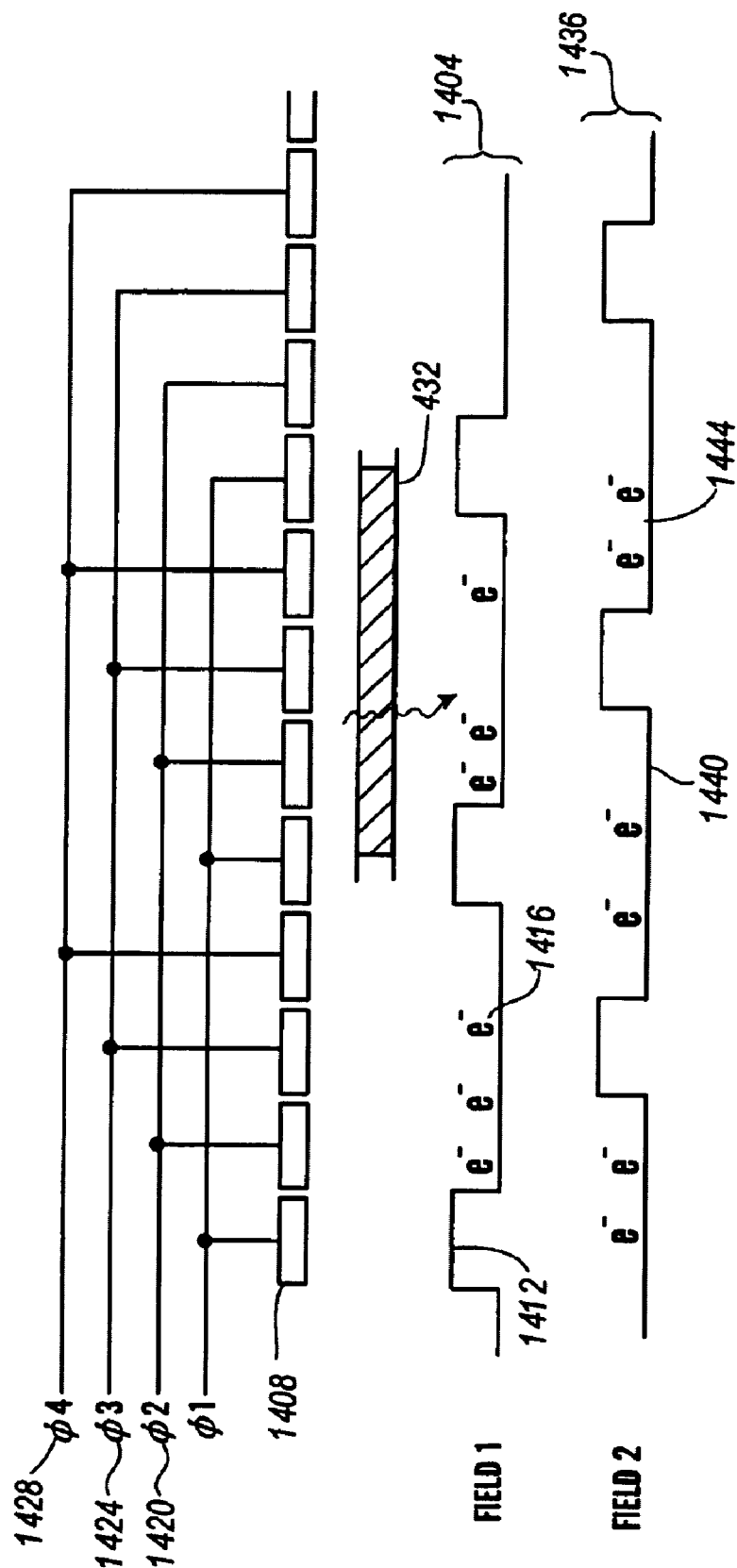
FIG. 14 depicts aspects of an interlaced imaging device sensor in accordance with an embodiment of the present invention.

FIG. 14 depicts aspects of an interlaced imaging device 100 in accordance with an embodiment of the present invention. In such a device, the center of collected information is shifted between the first and second fields comprising a frame of image data. Because of the shift in the center of the signal collection site, the requirements for the placement of the color microfilters needed in connection with pixels providing color information is potentially problematic.

In FIG. 14, one solution for providing color information in connection with an embodiment of the present invention utilizing a pseudo-interlaced system is illustrated. In FIG. 14, a four phase device is used for illustration purposes. Field 1 1404 uses phase 1 1408 as the barrier phase 1412 for the signal 1416 that is collected by phases 2 1420, 3 1424 and 4 1428. The color microfilter 432 is centered on the field 1 1404 collection site in the vertical axis. Above and below the microfilter 432, there is no spectral filter, and therefore the full spectrum falls on the other pixels. In field 2 1436, the placement of the microfilter 432 results in two collection sites 1440 and 1444 that do not receive full spectrum information. Accordingly, collection sites 1440 and 1444 are discarded from the signal provided in connection with field 2 1436, and color samples are only taken with respect to field 1 1404.

In accordance with an embodiment of the present invention, the amount of chrominance signal gain can be adjusted according to the light levels available in a scene. For example, at very low light levels, the chrominance signal gain can be reduced to reduce noise. The variation in signal gain can be implemented in connection with an automatic gain control (AGC) circuit.

In addition, the relatively low resolution chrominance signal, as compared to the luminance signal, provided by the present invention, allows a frame delay with respect to color channel information, with little or no deterioration in the provided image. The implementation of a frame delay can provide additional time for signal processing and for spatial filtering of the chrominance signal. The chrominance signals may also be averaged over a number of frames to improve the signal to noise ratio of the color information.

Figure 15:
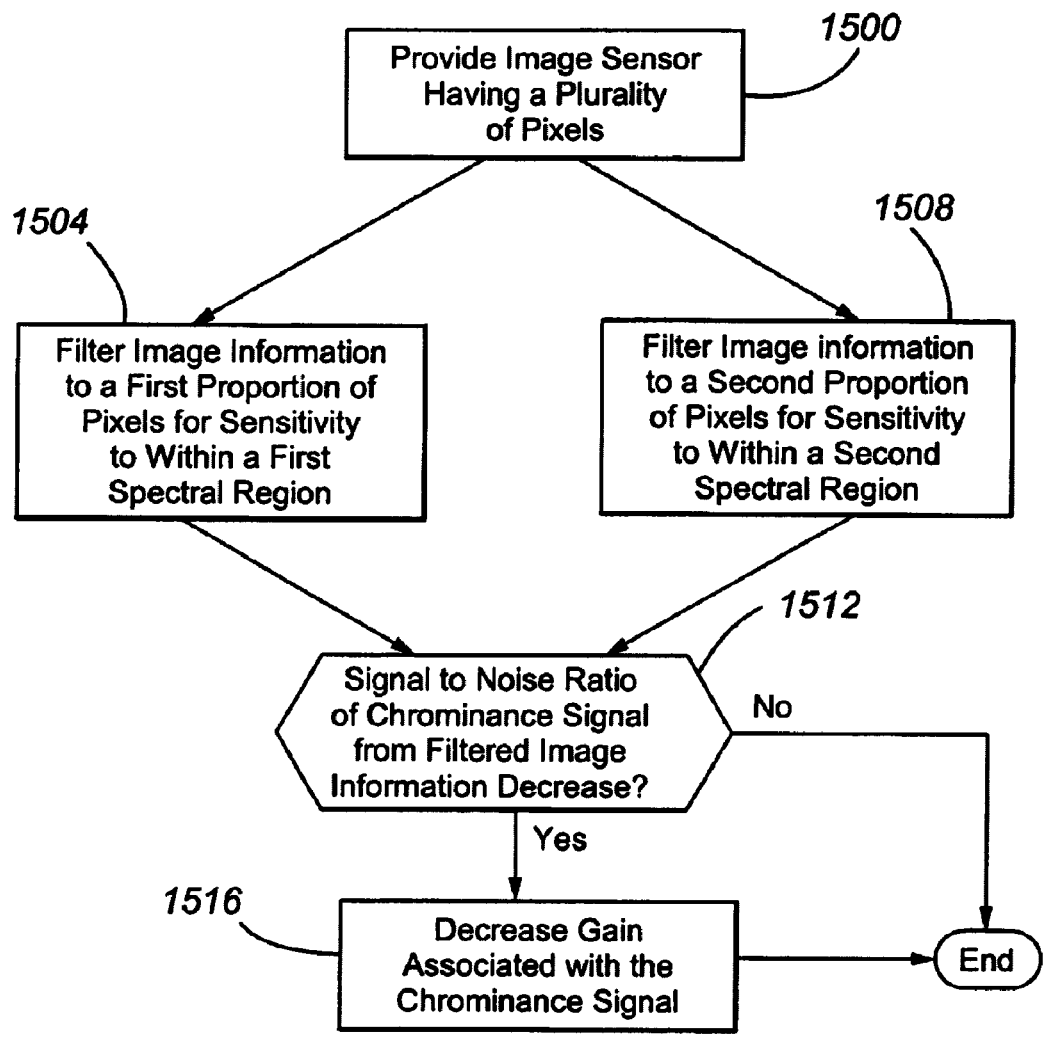
FIG. 15 is a flow diagram depicting aspects of a method for providing a low light level camera in accordance with embodiments of the present invention.

With reference now to FIG. 15, aspects of the operation of embodiments of the present invention in adjusting a gain amount are illustrated. Initially, at step 1500, an image sensor having a plurality of pixels is provided. The image information is filtered to a first proportion of the pixels, such that the first proportion of pixels is sensitive to a first spectral region (step 1504). At step 1508, image information to a second proportion of pixels is filtered for sensitivity to a second spectral region. As can be appreciated by one of skill in the art, steps 1504 and 1508 can be performed simultaneously. At step 1512, a determination is made as to whether a signal to noise ratio of a chrominance signal from filtered image information has decreased. If the signal to noise ratio of the chrominance signal has decreased, the gain associated with the chrominance signal is decreased (step 1516). After the gain has been decreased, or after a determination that a signal to noise ratio of the chrominance signal from the filtered image information has not decreased, the process may end.

Figure 16:
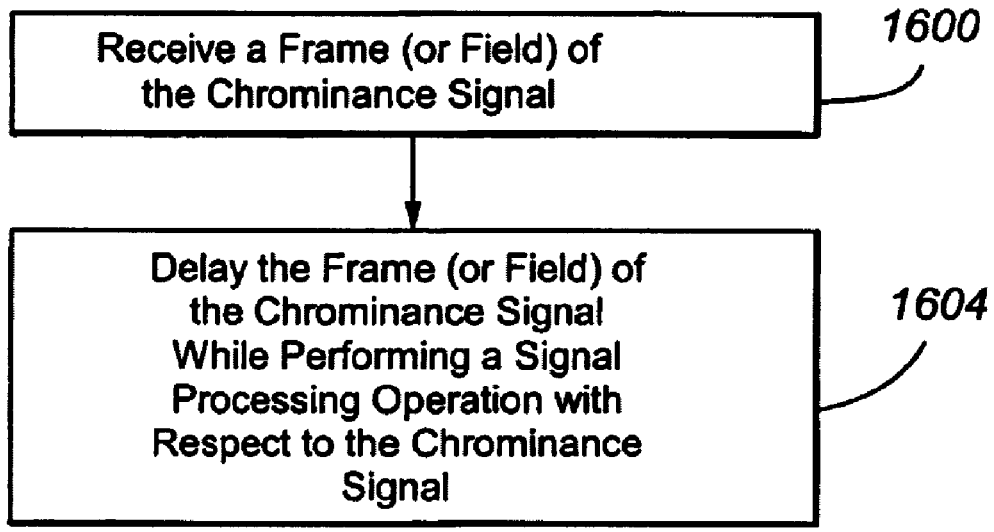
FIG. 16 is a flow diagram depicting aspects of a method for providing a low light level camera in accordance with embodiments of the present invention.

With reference now to FIG. 16, aspects of the operation of embodiments of the present invention in connection with delaying color information for processing are illustrated. Initially, at step 1600, a frame (or field) of the chrominance or color information signal is received. At step 1604, the frame (or field) of the chrominance signal is delayed while a signal processing operation with respect to the chrominance signal is performed.

Figure 17:
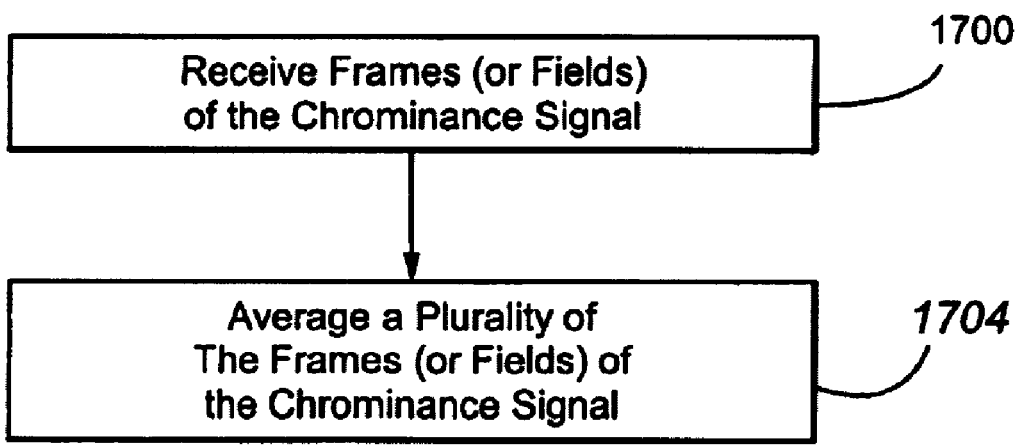
FIG. 17 is a flow diagram depicting aspects of a method for providing a low light level camera in accordance with embodiments of the present invention.

With reference now to FIG. 17, aspects of the operation of embodiments of the present invention in averaging chrominance information are illustrated. Initially, at step 1700, frames (or fields) or the chrominance signal are received. At step 1704, the plurality of frames or fields of the chrominance signal are averaged.

Figure 18:
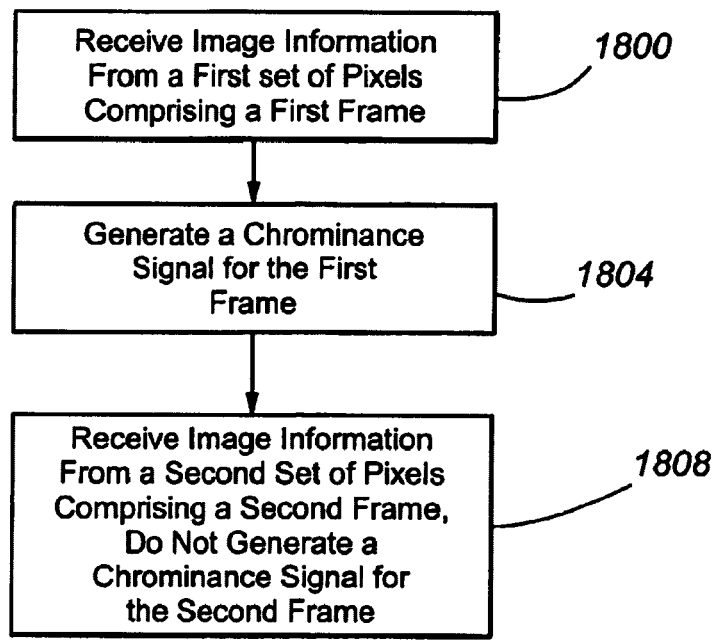
FIG. 18 is a flow diagram depicting aspects of a method for providing a low light level camera in accordance with embodiments of the present invention.

With reference now to FIG. 18, aspects of the operation of embodiments of the present invention in which color samples are only taken with respect to some fields or frames of information are depicted. Initially, at step 1800, image information from a first set of pixels comprising a first frame (or field) is received. At step 1804, a chrominance signal for the first frame is generated. At step 1808, image information from a second set of pixels comprising a second frame is received, but a chrominance signal for the second frame is not generated.

Figure 19:
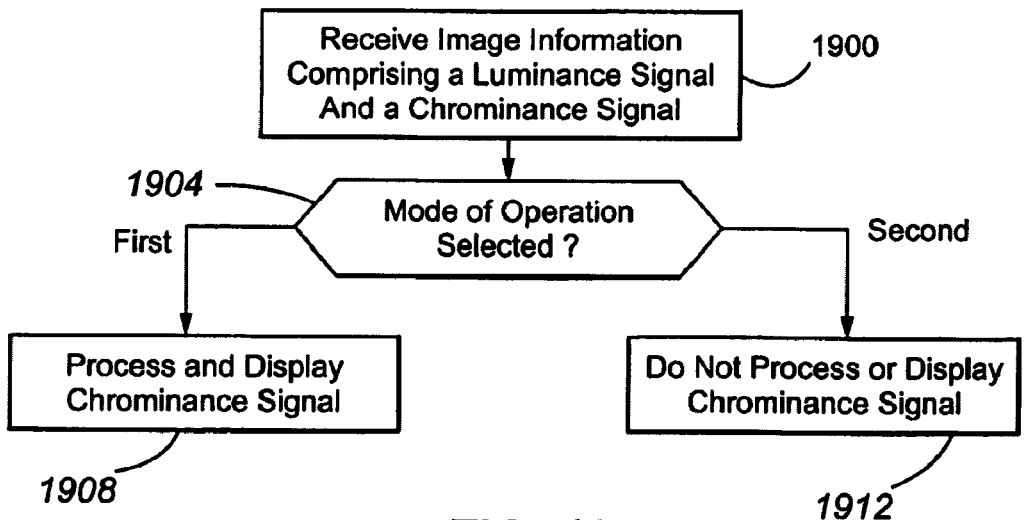
FIG. 19 is a flow diagram depicting aspects of a method for providing a low light level camera in accordance with embodiments of the present invention.

With reference now to FIG. 19, aspects of the operation of embodiments of the present invention in connection with enabling different modes of operation are illustrated. Initially, at step 1900, image information comprising a luminance signal and a chrominance signal is received. At step 1904, a determination is made as to the particular mode of operation that is selected. If a first or color enabled mode of operation is selected, a chrominance signal is processed and displayed (step 1908). Accordingly, in the first mode of operation, both a luminance signal and a chrominance signal are used to create a displayed image. If at step 1904, it is determined that a second mode of operation has been selected, a chrominance signal is not processed or displayed (step 1912). Accordingly, in a second mode of operation only luminance information is used to create a displayed image.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best mode presently known of practicing the invention and to enable others skilled in the art to utilize the invention in such or in other embodiments and with various modifications required by their particular application or use of the invention. It is intended that the appended claims be construed to include the alternative embodiments to the extent permitted by the prior art.

What is claimed is:

1. A method for providing a low light level camera, comprising:
    providing an image sensor comprising a plurality of pixels located within a first area to define a single focal surface;
    filtering image information to a first proportion of said pixels for sensitivity to within a selected first spectral region; and
    filtering image information to a second proportion of said pixels for sensitivity to within a selected second spectral region, wherein less than one-third of said image sensor pixels receive image information filtered to within said first or second spectral regions, wherein more than one-third of said pixels of said image sensor receive image information that is not filtered to within said first and second selected spectral regions, and wherein said more than one-third of said pixels are sensitive to light having a wavelength greater than about 780 nanometers.

2. The method of claim 1, wherein said image information that is not filtered to within said first or second spectral regions comprises a luminance signal, and wherein said filtered image information comprises a chrominance signal.

3. The method of claim 1, wherein said first proportion of pixels and said second proportion of pixels are pseudo-randomly distributed among all of said pixels of said image sensor.

4. The method of claim 1, wherein said first proportion of pixels and said second proportion of pixels are distributed about lines that are not parallel to sides of said image sensor.

5. The method of claim 2, further comprising outputting an image sensed by said low light level camera, wherein at least a first part of said image is derived from an area of said image sensor comprising a pixel receiving image information that is not filtered to within said first or second spectral regions and wherein chrominance information for said first part of said image is derived from at least a first pixel receiving filtered image information located at least one of within and proximate to said at least a first part of said image sensor.

6. The method of claim 2, further comprising outputting an image sensed by said low light level camera, wherein at least a first part of said image comprising a pixel receiving unfiltered image information is provided with chrominance information derived from a plurality of pixels receiving filtered image information.

7. The method of claim 2, further comprising:
    adjusting a gain associated with said chrominance signal.

8. The method of claim 7, wherein said gain is reduced in response to a decrease in a signal to noise ratio of said chrominance signal.

9. The method of claim 2, further comprising:
    delaying at least one of a frame and a field of said chrominance signal relative to a corresponding at least one of a frame and a field of said luminance signal; and
    performing a signal processing operation with respect to said chrominance signal.

10. The method of claim 2, further comprising:
    averaging a plurality of at least one of frames and fields of said chrominance signal.

11. The method of claim 2, wherein said image sensor comprises a first set of pixels comprising a first frame and a second set of pixels comprising a second frame, said method further comprising:
    generating said chrominance signal with respect to said first frame but not said second frame.

12. The method of claim 2, wherein in a first mode of operation said chrominance signal is processed and displayed and wherein in a second mode of operation said chrominance signal is not processed and is not displayed.

13. The method of claim 1, wherein 15% or less of said image sensor pixels receive image information filtered to have sensitivity within said first or second spectral regions.

14. The method of claim 1, wherein 12% or less of said image sensor pixels receive image information filtered to have sensitivity within said first or second spectral regions.

15. The method of claim 1, further comprising providing said first and second proportions of pixels and pixels not included in said first and second proportions of pixels image information simultaneously.

16. The method of claim 1, wherein said single focal surface comprises a focal plane.

17. The method of claim 1, wherein no more than 10% of said image sensor pixels receive image information filtered for sensitivity to within one of said first and second spectral regions.

18. A method for providing a low light level camera, comprising:
    providing an image sensor comprising a plurality of pixels located within a first area to define a single focal surface;
    filtering image information to a first proportion of said pixels for sensitivity to within a selected first spectral region;
    filtering image information to a second proportion of said pixels for sensitivity to within a selected second spectral region; and
    filtering image information to a third proportion of said pixels for sensitivity to within a selected third spectral region, wherein less than one-third of said image sensor pixels receive image information filtered for sensitivity to within said first, second and third spectral regions.

19. The method of claim 18, wherein said first proportion of pixels, said second proportion of pixels and said third proportion of pixels are randomly distributed among all of said pixels of said image sensor.

20. The method of claim 18, wherein a plurality of elements comprising four filter units for four of said image sensor pixels are formed, wherein for each of said elements first and second of said filter units pass energy in said first spectral region, a third of said filter units passes energy in said second spectral region, and a fourth of said filter units passes energy in said third spectral region.

21. The method of claim 20, wherein said elements are distributed randomly among said pixels of said image sensor.

22. The method of claim 20, wherein said elements are distributed about lines that are not parallel to edges of said image sensor.

23. The method of claim 18, wherein said image information provided to said pixels not included in said first, second and third proportions of pixels comprises full spectrum image information.

24. The method of claim 18, wherein 15% or less of said image sensor pixels receive image information filtered to within one of said first, second or third spectral regions.

25. The method of claim 18, wherein 12% or less of said image sensor pixels receive image information filtered to within one of said first, second or third spectral regions.

26. The method of claim 18, wherein pixels receiving said filtered image information are arranged in a plurality of groups, and wherein most of said groups are surrounded by a plurality of pixels that do not receive image information filtered to within one of said first, second and third spectral regions.

27. The method of claim 18, wherein no more than 10% of said image sensor pixels receive image information filtered for sensitivity to within one of said first, second and third spectral regions.

28. A method for providing a low light level camera, comprising:
providing an image sensor comprising a plurality of pixels located within a first area to define a single focal surface;
filtering image information to a first proportion of said pixels for sensitivity to within a selected first spectral region; and
filtering image information to a second proportion of said pixels for sensitivity to within a selected second spectral region, wherein less than one-third of said image sensor pixels receive image information filtered to within said first or second spectral regions, wherein said first and second spectral regions overlap and no more than 10% of said image sensor pixels receive image information filtered for sensitivity to within one of said first and second spectral regions.

29. A device for color imaging in low light level conditions, comprising:
an image sensor, wherein said image sensor comprises:
a first plurality of pixels particularly sensitive to luminance;
a second plurality of pixels particularly sensitive to chrominance, wherein said first plurality of pixels comprises more than two-thirds of a total number of pixels of said image sensor, wherein at least some pixels included in said first plurality pixels are adjacent to at least one of said pixels included in said second plurality of pixels, wherein said second plurality of pixels are arranged in groups of three, and wherein each of said groups comprises a first pixel having sensitivity to a first spectral band, a second pixel having sensitivity to a second spectral band, and a third pixel having sensitivity to a third spectral band.

30. The device of claim 29, wherein said second plurality of pixels are weighted about lines that are not parallel to edges of said image sensor.

31. The device of claim 29, wherein said second plurality of pixels are distributed about diagonals of said image sensor.

32. The device of claim 29, wherein pixels included in said second plurality of pixels are distributed among said first plurality of pixels such that each pixel included in said second plurality of pixels is adjacent to at least one pixel included in said first plurality of pixels.

33. The device of claim 29, wherein each of said three pixels is sensitive to a different range of wavelengths, and wherein at least two edges of each of said groups are bordered by pixels included in said first plurality of pixels.

34. The device of claim 29, wherein at least most of said groups of pixels included in said second plurality of pixels are surrounded by a number of pixels included in said first plurality of pixels.

35. The device of claim 29, wherein said second plurality of pixels comprises less than 10% of said total number of pixels of said image sensor.

36. A device for color imaging in low light level conditions, comprising:
an image sensor, wherein said image sensor comprises:
a first plurality of pixels particularly sensitive to luminance;
a second plurality of pixels particularly sensitive to chrominance, wherein said first plurality of pixels comprises more than two-thirds of a total number of pixels of said image sensor, wherein at least some pixels included in said first plurality pixels are adjacent to at least one of said pixels included in said second plurality of pixels, wherein said second plurality of pixels are arranged in groups of four, and wherein each of said groups comprises first and second pixels having sensitivity to a first spectral band, a third pixel having sensitivity to a second spectral band, and a fourth pixel having sensitivity to a third spectral band.

37. The device of claim 36, further comprising a plurality of filters, wherein a first filter type allows light within said first spectral band to reach said first and second pixels, wherein a second filter type allows light within said second spectral band to reach said third pixels, and wherein a third filter type allows light within said third spectral band to reach said fourth pixels.

38. The device of claim 36, wherein said second plurality of pixels comprises less than 10% of said total number of pixels of said image sensor.

39. A device for color imaging in low light level conditions, comprising:
an image sensor, wherein said image sensor comprises:
a first plurality of pixels particularly sensitive to luminance;
a second plurality of pixels particularly sensitive to chrominance, wherein said first plurality of pixels comprises more than two-thirds of a total number of pixels of said image sensor, wherein at least some pixels included in said first plurality pixels are adjacent to at least one of said pixels included in said second plurality of pixels, and wherein said second plurality of pixels are pseudo-randomly distributed about said image sensor.

40. The device of claim 39, wherein said second plurality of pixels comprises less than 10% of said total number of pixels of said image sensor.

41. A device for color imaging in low light level conditions, comprising:
an image sensor, wherein said image sensor comprises:
a first plurality of pixels particularly sensitive to luminance;

a second plurality of pixels particularly sensitive to chrominance, wherein said first plurality of pixels comprises more than two-thirds of a total number of pixels of said image sensor, and wherein at least some pixels included in said first plurality pixels are adjacent to at least one of said pixels included in said second plurality of pixels; and a switch, wherein said switch is operable to selectively turn off a signal from said second plurality of pixels.

42. The device of claim 41, wherein said second plurality of pixels comprises less than 10% of said total number of pixels of said image sensor.

43. A device for color imaging in low light level conditions, comprising:

an image sensor, wherein said image sensor comprises:
a first plurality of pixels particularly sensitive to luminance;
a second plurality of pixels particularly sensitive to chrominance, wherein said first plurality of pixels comprises more than half of a total number of pixels of said image sensor, wherein said second plurality of pixels comprises less than 4% of said total number of pixels of said image sensor.

44. A low light level image sensor, comprising:
a first image sensor comprising an array of pixels;
a color filter, wherein a first plurality of said pixels are provided with image information filtered to within a first spectrum defined by a first band pass filter, wherein a second plurality of said pixels are provided with image information filtered to within a second spectrum defined by a second band pass filter, wherein a third plurality of said pixels are provided with image information filtered to within a third spectrum by a third band pass filter, and wherein said first, second, and third pluralities of pixels provided with image information filtered to within said first, second or third spectrum comprise less than one-third of a total number of said pixels of said image sensor, and wherein said first, second and third pluralities of pixels provide at least color information.

45. The low light level image sensor of claim 44, wherein a majority of said pixels of said image sensor receive image information at wavelengths greater than 780 nanometers.

46. The low light level image sensor of claim 44, wherein said first, second, and third pluralities of pixels provided with filtered image information are distributed randomly among said pixels of said image sensor.

47. The low light image sensor of claim 44, wherein said first, second and third pluralities of pixels provided with image information filtered to within said first, second or third spectrum are distributed about said image sensor in groups comprising at least one pixel of each of said first, second and third pluralities of pixels, and wherein at least most of said groups are surrounded by a plurality of pixels that are not provided with image information filtered to within said first, second or third spectrum.

48. The low light image sensor of claim 44, further comprising a switch, wherein signals from said first, second, and third pluralities of pixels can be selectively switched off.

49. The low light image sensor of claim 44, wherein said first, second, and third pluralities of pixels are interspersed among pixels of said image sensor that are provided with image information that is not filtered to within one of said first, second and third spectrums such that a majority of pixels included in said first, second, and third pluralities of pixels has at least one pixel that is provided with image information that is not filtered to within one of said first, second and third spectrums as a neighbor pixel.

50. The device of claim 44, wherein at least some of said pixels included in said second plurality of pixels are arranged in groups, wherein at least some of said groups are surrounded by pixels not included in said first, second or third pluralities of pixels.

51. The low light level image sensor of claim 44, wherein said first, second, and third pluralities of pixels provided with image information filtered to within said first, second, or third spectrum comprise less than 10% of a total number of said pixels of said image sensor.

52. A low light level image sensor, comprising:
a first image sensor comprising an array of pixels;
a color filter, wherein a first plurality of said pixels are provided with image information filtered by a first band pass filter, wherein a second plurality of said pixels are provided with image information filtered by a second band pass filter, wherein a third plurality of pixels are provided with image information filtered by a third band pass filter, wherein said pixels are arranged in groups of pixels including at least one pixel from each of said first, second and third pluralities of pixels, and wherein a plurality of said groups are surrounded by a plurality of pixels that do not receive image information filtered by a first, second or third band pass filter.

53. The low light image sensor of claim 52, wherein said first, second, and third pluralities of pixels comprise less than 10% of a total number of pixels included in said first image sensor.

* * * * *